J. B. WOLFSDORFF.
MACHINE FOR BRUSHING FELT.
APPLICATION FILED JUNE 10, 1908.

915,525.

Patented Mar. 16, 1909.
2 SHEETS—SHEET 2.

WITNESSES

INVENTOR
Julius B. Wolfsdorff
BY
ATTORNEYS

UNITED STATES PATENT OFFICE.

JULIUS B. WOLFSDORFF, OF NEW YORK, N. Y.

MACHINE FOR BRUSHING FELT.

No. 915,525.  Specification of Letters Patent.  Patented March 16, 1909.

Application filed June 10, 1908. Serial No. 437,692.

*To all whom it may concern:*

Be it known that I, JULIUS B. WOLFSDORFF, a citizen of the United States, and a resident of the city of New York, borough of Brooklyn, in the county of Kings and State of New York, have invented a new and Improved Machine for Brushing Felt, of which the following is a full, clear, and exact description.

This invention relates to certain improvements in machines for brushing felt, and more particularly to brushing that type of felt employed in the manufacture of hats.

The object of the invention is to provide means whereby a plurality of circular pieces of felt may simultaneously be brushed while in a moistened condition.

Reference is to be had to the accompanying drawings, forming a part of this specification, in which similar characters of reference indicate corresponding parts in all the figures, and in which—

Figure 1:
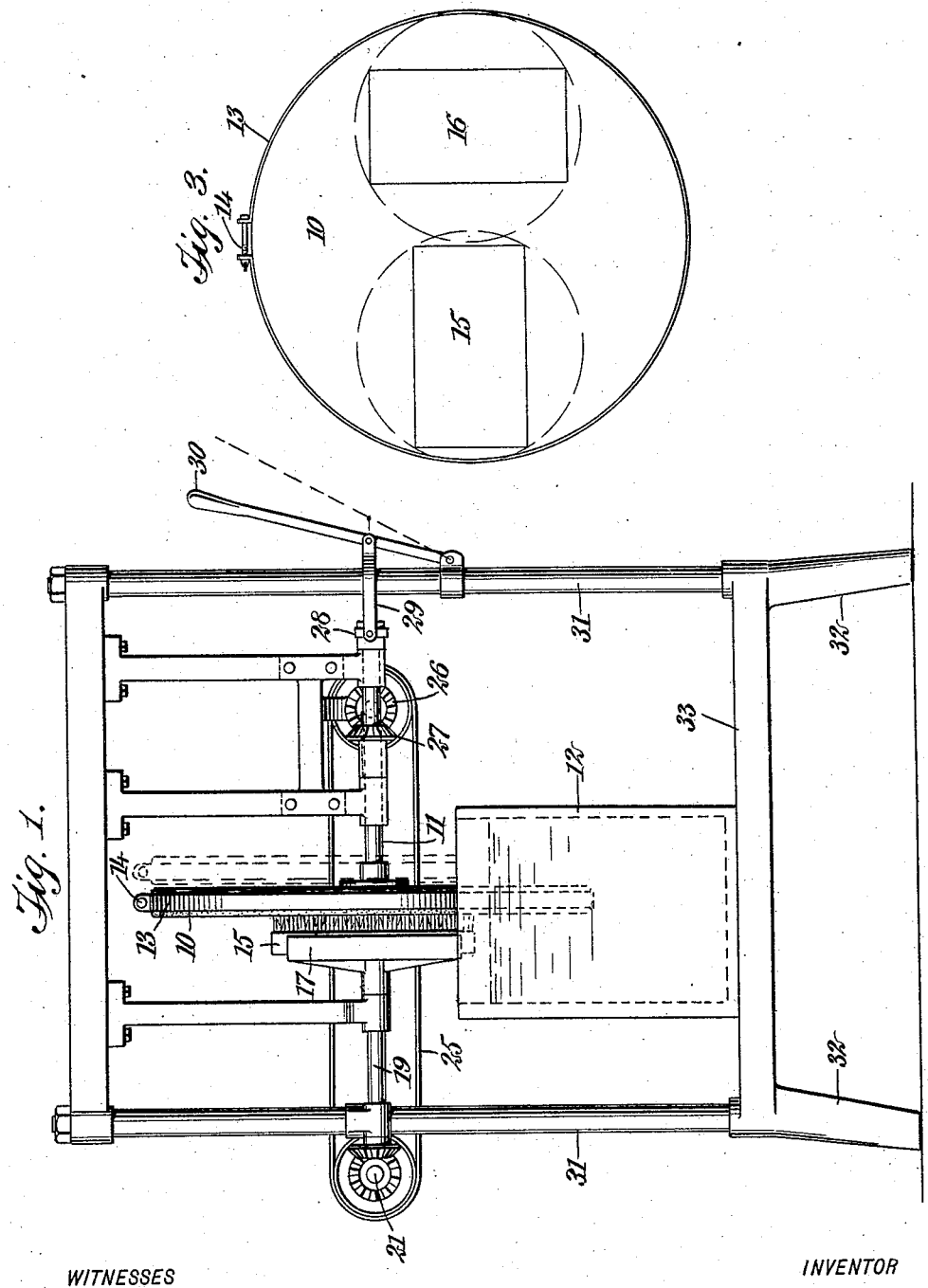
Figure 2:
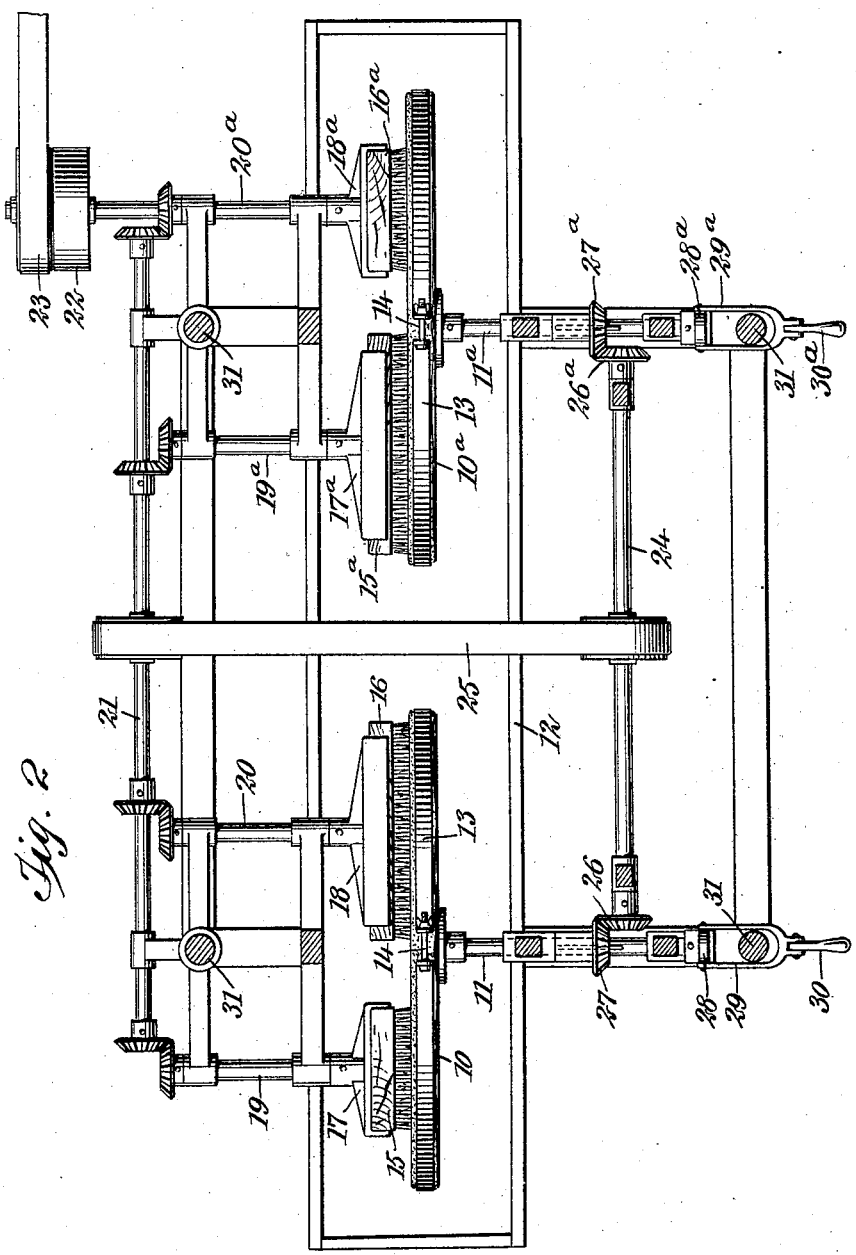

Figure 1 is an end view of a machine constructed in accordance with my invention; Fig. 2 is a top plan view of the operating mechanism thereof, a portion of the frame being shown in section, and Fig. 3 is a face view of one of the felt-supporting disks and showing diagrammatically the position of the brushes in respect thereto.

In the specific form shown, I employ two disks 10, $10^a$ mounted to rotate on substantially parallel shafts 11, $11^a$, and each having the lower portion thereof extending into a tank or trough 12, adapted to receive hot water or other liquid with which it is desired to treat the felt while it is being brushed. The disks are preferably formed of wood and the felt may be secured thereto in any suitable manner. As shown, I employ a band 13 encircling each disk and having a screw bolt 14 connecting together the ends of the band and by means of which it may be tightened to grip the marginal portions of the felt against the periphery of the disk. The disks are caused to rotate by suitable mechanism, and adjacent the face of each disk and also adapted to rotate, are suitable brushes.

Adjacent the disk 10, I mount two brushes 15 and 16, detachably secured to suitable holders 17 and 18 mounted on parallel shafts 19 and 20. The shafts 19 and 20 are in substantially the same plane as the shaft 11 of the disk, but the first-mentioned shafts are on opposite sides of the shaft 11. The brushes are of substantially rectangular form and are of such size that as the disk and the brushes rotate, the entire surface of the felt is operated upon. Corresponding to the brushes 15 and 16 of the disk 10, similar brushes $15^a$ and $16^a$ fastened to holders $17^a$ and $18^a$ on shafts $19^a$ and $20^a$, are provided for the disk $10^a$. Each of the shafts 19 and 20, $19^a$ and $20^a$ is provided with a bevel gear through which it is rotated from a drive shaft 21. Thus all of the brushes rotate simultaneously and preferably at the same speed. One of the shafts, for instance, the shaft $20^a$, is provided with fast and loose pulleys 22 and 23, whereby it receives motion direct from the source of power and transmits motion through the shaft 21 to the shafts 19, 20 and $19^a$. Upon the opposite sides of the machine, there is mounted a shaft 24 connected by a belt 25 to the shaft 21, and at the ends of this shaft are bevel pinions 26 and $26^a$. Upon the shafts 11 and $11^a$ are bevel pinions 27 and $27^a$, keyed to prevent their rotation in respect to said shafts but permitting the longitudinal movement of the shafts therethrough. The pinions are held against longitudinal movement by the pinions 26, $26^a$ and portions of the supporting frame. The shafts 11, $11^a$, are provided with rotatable collars 28, $28^a$ upon their outer ends, and these collars are provided with yokes 29, $29^a$ connected to levers 30, $30^a$. By operating the levers, the shafts 11 and $11^a$ may be moved longitudinally to bring the disks out of or into engagement with the brushes.

Any suitable form of frame may be provided for supporting the mechanism above described. As shown, the frame includes four uprights 31, from which suitable hangers extend for journaling the shafts. The uprights at their lower ends connect with corner posts 32, and at the junction of the posts and the uprights are transverse braces 33 for supporting the liquid tank 12.

All of the shafts, brushes and disks are continuously rotated while the driving belt is on the fast pulley, but the felt when it has been brushed to a sufficient extent, may be moved out of engagement with the corresponding brushes. The felt dips into the liquid in the tank 12 during the rotation, and while in a wet condition is operated upon by the brushes to secure the desired results.

Having thus described my invention, I claim as new and desire to secure by Letters Patent:

1. A felt-brushing machine, including a vertically-disposed disk having a smooth supporting surface, means adjacent the periphery of said disk for securing to the face thereof a sheet of felt, means for rotating said disk, a tank receiving the lower edge of said disk, and a brush rotatably mounted in engagement with said felt.

2. A machine for brushing felt, comprising a vertically-disposed rotatable disk having a plane smooth face, means adjacent the periphery thereof for securing to said face a sheet of felt, a tank receiving the lower edge of said disk, a plurality of brushes rotatably mounted in engagement with the felt at opposite sides of the center of the disk, and means for rotating said brushes and disk simultaneously.

3. A machine for brushing felt, comprising a flat rotatable disk having a smooth face, means for securing to said face a sheet of felt to be operated upon, a brush rotatably mounted adjacent said disk, and means for simultaneously rotating said disk and said brush, the axis of the rotation of the disk and brush being substantially parallel and out of alinement with each other.

4. A machine for brushing felt, comprising a flat rotatable disk having a smooth face, means for securing to said face, a sheet of felt to be operated upon, a brush rotatably mounted in engagement with the felt on said face, the axis of the rotation of the disk and brush being parallel and out of alinement with each other, and means for moistening said felt.

5. A machine for brushing felt, comprising a flat rotatable disk having a plane surface, means adjacent the periphery thereof for securing to said surface a sheet of felt to be operated upon, a brush mounted adjacent said disk, means for moistening said felt, and means for moving said disk and felt axially out of engagement with the brush.

In testimony whereof I have signed my name to this specification in the presence of two subscribing witnesses.

JULIUS B. WOLFSDORFF.

Witnesses:
 OSCAR KOERNER,
 WOLF SEGALL.